US011860759B2

(12) United States Patent
Kaitha

(10) Patent No.: US 11,860,759 B2
(45) Date of Patent: Jan. 2, 2024

(54) USING MACHINE LEARNING FOR AUTOMATICALLY GENERATING A RECOMMENDATION FOR A CONFIGURATION OF PRODUCTION INFRASTRUCTURE, AND APPLICATIONS THEREOF

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 242 days.

(21) Appl. No.: 17/372,885

(22) Filed: Jul. 12, 2021

(65) Prior Publication Data

US 2023/0011315 A1 Jan. 12, 2023

(51) Int. Cl.

| | |
|---|---|
| ***G06F 11/34*** | (2006.01) |
| ***G06N 5/04*** | (2023.01) |
| ***G06N 20/00*** | (2019.01) |

(52) U.S. Cl.

CPC ...... *G06F 11/3495* (2013.01); *G06F 11/3428* (2013.01); *G06F 11/3447* (2013.01); *G06N 5/04* (2013.01); *G06N 20/00* (2019.01)

(58) Field of Classification Search

CPC ............. G06F 11/3495; G06F 11/3428; G06F 11/2247; G06F 11/2289; G06F 11/3447; G06F 11/3452; G06F 11/0793

See application file for complete search history.

(56) References Cited

U.S. PATENT DOCUMENTS

| | | | | |
|---|---|---|---|---|
| 9,043,788 | B2 | 5/2015 | Garrett et al. | |
| 10,042,697 | B2 | 8/2018 | Ahad | |
| 10,142,204 | B2 | 11/2018 | Nickolov et al. | |
| 10,275,331 | B1 | 4/2019 | Gudka et al. | |
| 10,452,521 | B2 | 10/2019 | Kaulgud et al. | |
| 10,691,450 | B2 | 6/2020 | Jose et al. | |
| 2005/0278703 | A1* | 12/2005 | Lo | H04L 41/5032 717/169 |

(Continued)

*Primary Examiner* — Yolanda L Wilson
(74) *Attorney, Agent, or Firm* — Sterne, Kessler, Goldstein & Fox P.L.L.C.

(57) ABSTRACT

Systems, methods and media are directed to automatically generating a recommendation. Data describing a configuration of a production infrastructure is received, the production infrastructure running the system operating in the production environment. One or more metrics data values indicative of a performance of the system operating in the production environment is retrieved. Expected performance values of the system are received. An augmented decisioning engine compares the metrics data values with the expected performance values. The augmented decisioning engine is trained to provide a recommended configuration of the production infrastructure. Based on the comparing, the augmented decisioning engine is trained to improve subsequent recommendations of configuration of the production infrastructure through a feedback process. The augmented decisioning engine is adjusted based on an indication of whether the configuration of production infrastructure satisfies a threshold metric data value in response to the production infrastructure running the system operating in a production environment.

20 Claims, 5 Drawing Sheets

100
User Device 160
Production Environment 140
Production Infrastructure 150
System 152
Computing Resource 155
Computing Resource 155
Computing Resource 155
Computing Resource 155
Network 180
Learning Engine 110
Test Infrastructure 130
Computing Clusters 132
Servers 134
Databases 136
Applications 138
APPs 155-1
VMs 155-2
VS 155-3
HYPs 155-4

(56) References Cited

U.S. PATENT DOCUMENTS

| | | | | |
|---|---|---|---|---|
| 2013/0080760 | A1 | 3/2013 | Li et al. | |
| 2015/0254162 | A1* | 9/2015 | Baril | G06F 11/3466<br>717/128 |
| 2018/0068250 | A1 | 3/2018 | Conti et al. | |
| 2018/0114234 | A1 | 4/2018 | Fighel | |
| 2018/0373617 | A1 | 12/2018 | Gaier et al. | |
| 2019/0050319 | A1 | 2/2019 | Gondalia et al. | |
| 2019/0108001 | A1 | 4/2019 | Hauser | |
| 2019/0147371 | A1 | 5/2019 | Deo et al. | |
| 2019/0294528 | A1 | 9/2019 | Avisror et al. | |
| 2019/0317880 | A1* | 10/2019 | Herr | G06F 11/3447 |
| 2019/0370610 | A1* | 12/2019 | Batoukov | G06F 11/0793 |
| 2020/0133661 | A1 | 4/2020 | Alexander | |
| 2020/0371892 | A1* | 11/2020 | Huang | G06F 11/3612 |
| 2021/0042570 | A1* | 2/2021 | Iskandar | G06F 11/3075 |
| 2021/0406146 | A1* | 12/2021 | Lange | G06F 11/3409 |

* cited by examiner

USING MACHINE LEARNING FOR AUTOMATICALLY GENERATING A RECOMMENDATION FOR A CONFIGURATION OF PRODUCTION INFRASTRUCTURE, AND APPLICATIONS THEREOF

BACKGROUND

Production infrastructure can be used to enable a variety of resources, such as websites, intranets, merchant payment systems, retail inventory systems, and the like. Any number of computing clusters, databases, servers, processors, routing equipment, and/or other computing devices can be connected in any variety of configurations to deliver these useful resources. Configurations can range from a simple web server and single database providing a low-traffic website to a few users, all the way to hundreds of interconnected devices providing an integrated enterprise system of networked applications and data repositories spread across wide geographies.

Non-functional requirement (NFR) testing is a critical step in developing and maintaining software systems and applications. Commonly, NFR tests whether non-functional aspects of a software system running on a production infrastructure with a particular configuration meets requirements. NFR testing can include performance testing, stress testing, load testing, recovery testing, resiliency testing, endurance testing, security testing, chaos testing, or scalability testing, among others, of a system/application. A software developer may perform an NFR test, or a series of NFR tests, to assess the overall performance and safety of a system or application during development and/or in production.

Performing NFR tests in production can be particularly laborious. This can manifest itself in terms of the number of tests that may need to be performed, the time it may take a developer to perform the tests, or the amount of computing resources needed to perform the tests. Likewise, the amount of time it takes the developer to analyze the results of the tests performed, and/or the amount of time it takes the developer to configure the system or application in the production environment based on the outcome of the tests performed are also time-intensive.

Current approaches to automating NFR testing are expensive and require a considerable amount of developer time to carry out. Accordingly, systems, methods, and media for improving the automation of NFR testing are needed.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

DETAILED DESCRIPTION

The NFR testing process may be improved by implementing an augmented decisioning engine employing a combination of artificial intelligence and machine learning algorithms with developer annotations to generate a recommendation of a configuration of a production infrastructure (e.g., the infrastructure on which the NFR testing is being performed). The recommendation is based on a comparison of one or more metrics data values indicating how the production infrastructure is operating, even "in real time", with expected performance values indicating how the production infrastructure should be operating under a given set of operating conditions or under a given load. To generate the recommendation, the augmented decisioning engine may train itself to improve subsequent generations of configuration of the production infrastructure through a feedback process. The feedback process may include input from a developer annotating the output of the test environment. The feedback process adjusts the augmented decisioning engine based on an indication of whether the configuration of the production infrastructure satisfies a threshold metric data value in response to the production infrastructure running the system operating in a production environment.

Utilizing the augmented decisioning engine of the present application, a developer need only indicate whether the configuration of the production infrastructure recommended by the augmented decisioning engine satisfies a threshold metrics data value by accepting or rejecting the recommendation. The remainder of the testing process, resulting in recommended configurations of infrastructure which can be reapportioned and/or reconfigured, can be driven by the training engine described in further detail below. By enabling a configuration of a production infrastructure to be optimized, one or more embodiments improve operation of a computing system. The developer is no longer tasked with conducting tests, analyzing the outcomes of the tests conducted, determining how to configure the production infrastructure based on the outcome of the test, or actually configuring the production infrastructure based on the outcome.

Figure 1:
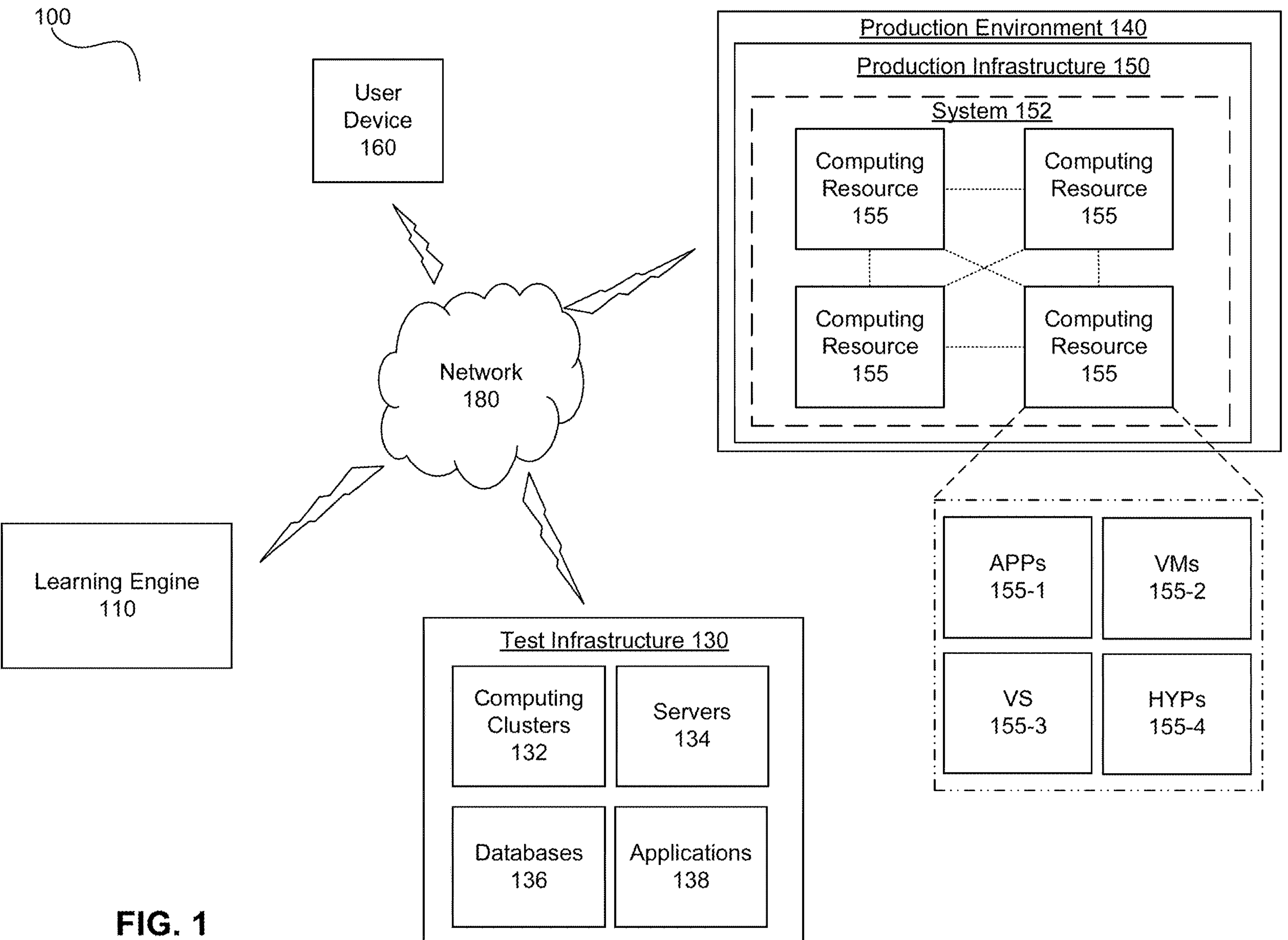
FIG. 1 is a general testing environment in which a system, computer-readable medium, and/or method of automatically generating a recommendation for production infrastructure may be implemented, according to an embodiment of the present disclosure.

FIG. 1 is a high-level block diagram of a general testing environment 100 in which systems, methods, and/or media may run (e.g., execute operations) to automatically generate a recommendation. As illustrated, general testing environment 100 (also referred to as simply "environment 100") includes multiple sub-systems. In some examples, environment 100 may be a cloud-based computing environment, an on-premises computing environment, or a hybrid computing environment using partially cloud-based and partially on-premises computing environments. Environment 100 may be an environment in which NFR testing is performed by the sub-systems included therein.

A learning engine 110, a test infrastructure 130, a production environment 140 implementing/hosting a production infrastructure 150, a user device 160, and a network 180 are among the sub-systems included in the environment 100. As illustrated, production infrastructure 150 includes a system 152. System 152 may include various computing resources 155 which may or may not be communicatively coupled to each other depending on the configuration of production infrastructure 150.

According to the present disclosure, learning engine 110 may retrieve data from production infrastructure 150 and/or any other computing systems (e.g., platforms, servers, mainframes, databases, etc.) implemented or hosted in production environment 140. Further, learning engine 110 may receive data from user device 160 via user input. Moreover, the learning engine 110 may be trained (with an augmented decisioning engine described in FIG. 2 below) based on the data received to automatically generate a recommendation. In some examples, the recommendation may be used to configure production infrastructure 150, system 152, or any other computing systems/infrastructure included in the production environment 140. In some embodiments, the learning engine 110 may configure the production infrastructure based on the generated recommendation(s).

In addition to the above, learning engine 110 and the various sub-components included therein may spin-up (e.g., power-up, launch, or otherwise instantiate) test infrastructure 130 to perform a test, or series of tests, on the data retrieved/received, the tests performed being based on the type of data. The outcomes of the tests are compared to generate a confidence score, and the confidence score is used as the basis of subsequent recommendations generated by learning engine 110.

As illustrated, test infrastructure 130 may include an assortment of computing clusters 132, servers 134, databases 136, and applications 138 (collectively "computing resources 13X"). In accordance with the present disclosure, learning engine 110 may configure computing resources 13X based on the type data retrieved from production infrastructure 150 and/or the type of data received via user device 160. Also, test infrastructure 130 may perform a test, or series of tests, on the data retrieved/received by learning engine 110 based on the configuring. Computing resources 13X included in test infrastructure 130 may be used to perform the test(s).

Once testing is complete, computing resources 13X may be used to transmit an outcome of the tests performed to learning engine 110, via network 180. Based on the type of data retrieved/received by learning engine 110, test infrastructure 130 may be configured to perform a test, or series of tests, on the data. Further, to maintain "normal" (e.g., expected) operation of any infrastructure included in production environment 140 (e.g., production infrastructure 150) and any systems (e.g., system 152) and/or computing resources (e.g., computing resources 155) included therein, computing resources 13X may be allocated or reapportioned to the infrastructure/systems based on the outcome of the tests performed.

Generally, a production environment, such as production environment 140, is an environment, or setting, in which software (e.g., applications, programs, components, etc.) are implemented "in the real world," and are operated by an end-user (e.g., a customer). The software may execute locally on a computing device (e.g., a computer, laptop, and/or server) of the end-user, the software may be hosted by a cloud-based computing environment, or a combination thereof.

In some embodiments, production environment 140 may be a cloud-based computing environment. In others, production environment 140 may not be cloud-based, or production environment 140 may be a hybrid environment. Various infrastructure, such as production infrastructure 150, front-end platforms, storage arrays, memory arrays, data management, synchronization, and/or long duration data transfers may be included in/hosted by production environment 140.

Production environment 140 may include multiple instances of a single production infrastructure, single instances of production infrastructures that are all unique from each other, or a combination thereof. And although embodiments and examples described herein are primarily directed to a production environment that is at least partially cloud-based, it is to be understood that any discussion of a production environment above or below extends and applies equally to production environments that are on-premise (e.g., a production environment which is entirely locally implemented or hosted).

Production infrastructure 150 may include a computing system (e.g., system 152), each system including a combination of computing resources (e.g., computing resources 155). In accordance with the present disclosure, production infrastructure 150, system 152, computing resources 155 included therein, and/or any other computing systems/resources included in production infrastructure 150 may be hosted by production environment 140. Further, production infrastructure 150 or any systems/computing resources included therein may provide computation, software, data access, storage, and/or other services that do not require end-user knowledge of a physical location of configuration of a system and/or a device that delivers the software.

In various embodiments, namely those in which production environment 140 is at least partially cloud-based, computing as a service may be delivered to/distributed throughout environment 100, whereby shared resources, services, etc. may be provided to learning engine 110, test infrastructure 130, production infrastructure 150, and/or user device 160 via network 180. Further, user device 160 may be used to coordinate, orchestrate, or otherwise influence the delivery/distribution of the shared resources. Examples of resources shared throughout environment 100 may include computing resources 13X and/or computing resources 155.

In accordance with the present disclosure, each of computing resources 155 may include one or more personal computers, workstations, computers, server devices, or other types of computation and/or communication devices. In some examples, computing resources 155 may be cloud computing resources that communicate with other cloud computing resources (e.g., other portions of computing resources 155) via a wired connection, a wireless connection, or a combination thereof.

Computing resources 155, which may be substantially similar/identical to the computing resources 13X, may include a group of cloud resources, such as one or more applications ("APPs") 155-1, one or more virtual machines ("VMs") 155-2, virtualized storage ("VS") 155-3, and one or more hypervisors ("HYPs") 155-4.

Application 155-1 may include one or more software applications that may be provided to or accessed by user device 160. Alternatively, application 155-1 may eliminate a need to install and execute software applications on user device 160. Application 155-1 may include software associated with production infrastructure 150 and/or any software configured to be provided across production environment 140. Application 155-1 may transmit information from one or more other applications 155-1 via a virtual machine 155-2.

Virtual machines 155-2 may include a software implementation of a machine (e.g., a computing device) that executes programs like a physical machine. VMs 155-2 may be a system VM or a process VM, depending upon the use and degree of correspondence to any real machine by VMs 155-2. A system VM may provide a complete system platform supporting execution of a complete operating system (OS). A process virtual machine may execute a single program and may support a single process. VMs 155-2 may execute on behalf of a user (e.g., user device 160) and/or on behalf of one or more other production infrastructures 150. Further, VMs 155-2 may manage additional infrastructure/functionality included in production environment 140.

Virtualized Storage 155-3 may include one or more storage systems and/or one or more storage devices utilizing virtualization techniques within the storage systems or devices of computing resources 155. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of a storage system flexibility in how administrators manage storage for end users. File virtualization may reduce/eliminate dependencies between data accessed at a file level and location where files are physically stored. Reduction or elimination of such dependencies may: enable optimization of storage use, permit server consolidation, and/or improve performance of non-disruptive file migrations.

Hypervisors 155-4 may provide hardware virtualization techniques, allowing multiple operations systems (e.g., "guest operating systems") to execute concurrently on a host computer, such as a computing resource(s) 155. Further, HYPs 155-4 may present a virtual operating platform to the guest operating systems, may manage multiple instances of the execution of a variety of operation systems (execution of the guest operating systems), and may share virtualized hardware resources.

Computing resources 155 may be communicatively coupled to each other based on the configuration of production infrastructure 150. Computing resources 155 may be multiple instances of the same resource or various combinations of any of the computing resources discussed above and below.

User device 160 may include a communication and/or computing device, such as a desktop computer, mobile device, smartphone, tablet, subnotebook, laptop, personal digital assistant (PDA), gaming device, device integrated with a vehicle, a wearable communication device (e.g., a smart wristwatch, smart eyeglasses, and the like), any other suitable communication device, or a combination thereof. User device 160 may be configurable to communicate with learning engine 110, test infrastructure 130, production infrastructure 150, any other infrastructure/computing system included in production environment 140, or any combination thereof, via network 180.

One or more portions of the network 180 may be an ad hoc network, an intranet, an extranet, a virtual private network (VPN), a local area network (LAN), a wireless LAN (WLAN), a portion of the Internet, a portion of the Public Switched Telephone Network (PSTN), a cellular telephone network, a wireless network, a WiFi network, a WiMax network, a Bluetooth network, any other type of network, or any combination thereof.

Figure 2:
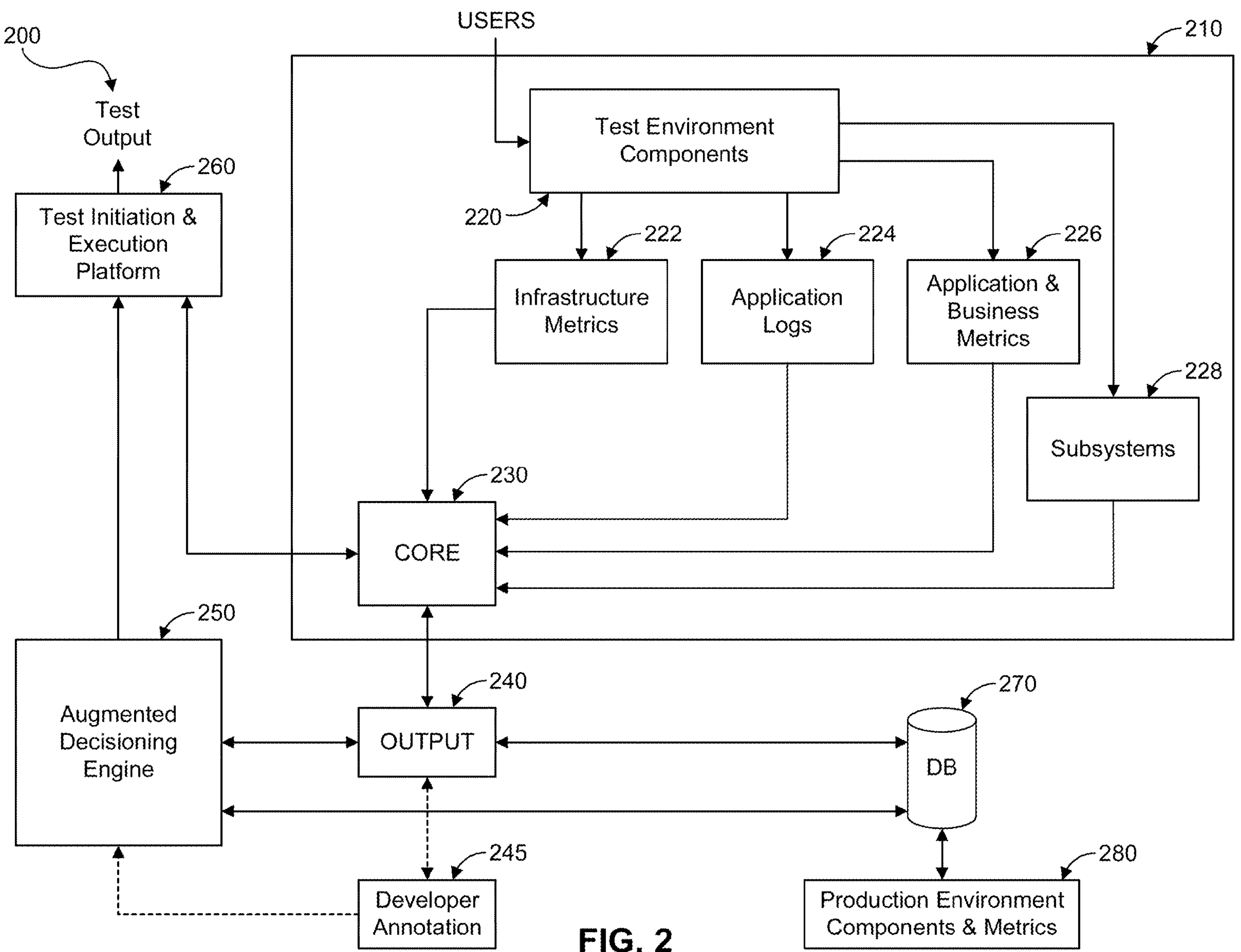
FIG. 2 is a testing system that may be implemented in the general testing environment of FIG. 1, according to an embodiment of the present disclosure.

FIG. 2 depicts a testing system 200 that may be implemented, for example, as part of learning system 110 in the general testing environment of FIG. 1, according to an embodiment of the present disclosure. Testing system 200 includes a developer system 210, which produces an output 240, an augmented decisioning engine 250 (which receives output 240 and a developer annotation 245), a testing initiation and execution platform 260 (or simply "testing platform 260"), a database 270, and a production environment 280.

Developer system 210 may include test environment components 220 (or simply "test components 220"), which are applications, functions within applications, or segments of computer-executable code under development by the developer. Test environment components 220 are combined with or are intended to adhere to infrastructure metrics 222 and/or application and business metrics 226. According to embodiments, infrastructure metrics 222 may include parameters such as CPU usage, bandwidth parameters, memory usage, timing requirements, and the like. Application and business metrics 226 may include parameters related to service level agreements and variables corresponding to the process of conducting business (e.g., the average time to complete and return an online form). The result of executing test environment components 220 produces application logs 224, which contain details regarding the execution of the code (e.g., timestamps, variables, outputs, values, addresses, routing information, etc.).

Test components 220 may be communicated with sub-systems 228 to enable transmission to core 230. Processing by core 230 results in output, which may be sent as output 240 or may be communicated directly with testing platform 260. The constituent portions of sub-systems 228 and core 230 may be substantially similar to those local and/or network-accessible devices described above and below with regard to the general testing environment 100.

Output 240 may be communicated to augmented decisioning engine 250 without developer input. Output 240 may include a user interface or graphical user interface enabling examination, validation, annotation, or other modification by the developer. In embodiments, output 240 may result in a developer annotation 245, which may be communicated to augmented decisioning engine 250 as well. As an example, developer annotation 245 may be an indication by the developer that test components 220 adhere to desired infrastructure metrics 222 as expected by a selected configuration of devices. On the other hand, developer annotation 245 could indicate that test components 220 are not in compliance with stated performance levels (or stated service levels as a result of performance levels) and that testing with a selected configuration should be re-executed, altered, reconfigured, or terminated.

Output 240 may be communicated to database 270 for persistence and later computation or reference. Production environment 280, which includes production components and production metrics, may also communicate with database 270. Database 270 thus may store near real-time as well as historical data regarding performance of production environment 280 and development system 210, such that a developer may compare realized and expected values for production components and test components 220. Stored values in database 270 may be used by the developer in order to make determinations for developer annotation 245.

Augmented decisioning engine 250 may receive output 240, developer annotation 245, and real-time or historical data from production environment 280 and developer system 210. Augmented decisioning engine 250 may supply one or more configurations for testing platform 260 as a result of one or more of the potential inputs (i.e., output 240, developer annotation 245 or stored data from database 270). As an example, augmented decisioning engine 250 may take output 240, developer annotation 245, and historical data from database 270, and process each input through a neural network to supply a configuration to testing platform 260. Other examples of machine learning and the operation of augmented decisioning engine 250 are addressed in further detail below.

As a further example, test components 220 may include an application or portion thereof for a payment system which processes credit card payments. In this example, application and business metrics 226 may include a stated service level agreement (SLA), wherein the application is capable of processing each payment in less than a specified timeframe (e.g., a millisecond) with an acceptable throughput of concurrent transactions (e.g., 1000 simultaneous payments). Based on infrastructure metrics 222 and/or production metrics stored in database 270 in conjunction with production environment 280, it may be expected that certain CPU and/or memory usage values result in the stated SLA values.

Continuing with the example, a configuration that results in higher-than-expected CPU usage may cause the developer to terminate the test and provide a developer annotation 245 that the selected configuration is not to be used. Conversely, a configuration that does execute as intended for the above-mentioned payment system may be output to augmented decisioning engine 250, without developer intervention or developer annotation 245, and categorized by augmented decisioning engine 250 as a successful test. Testing system 200 allows for configurations, metrics and performance to be monitored in real-time, or near real-time, so that tests can be completed to eliminate certain configurations that are not compliant with stated metrics.

Figure 3:
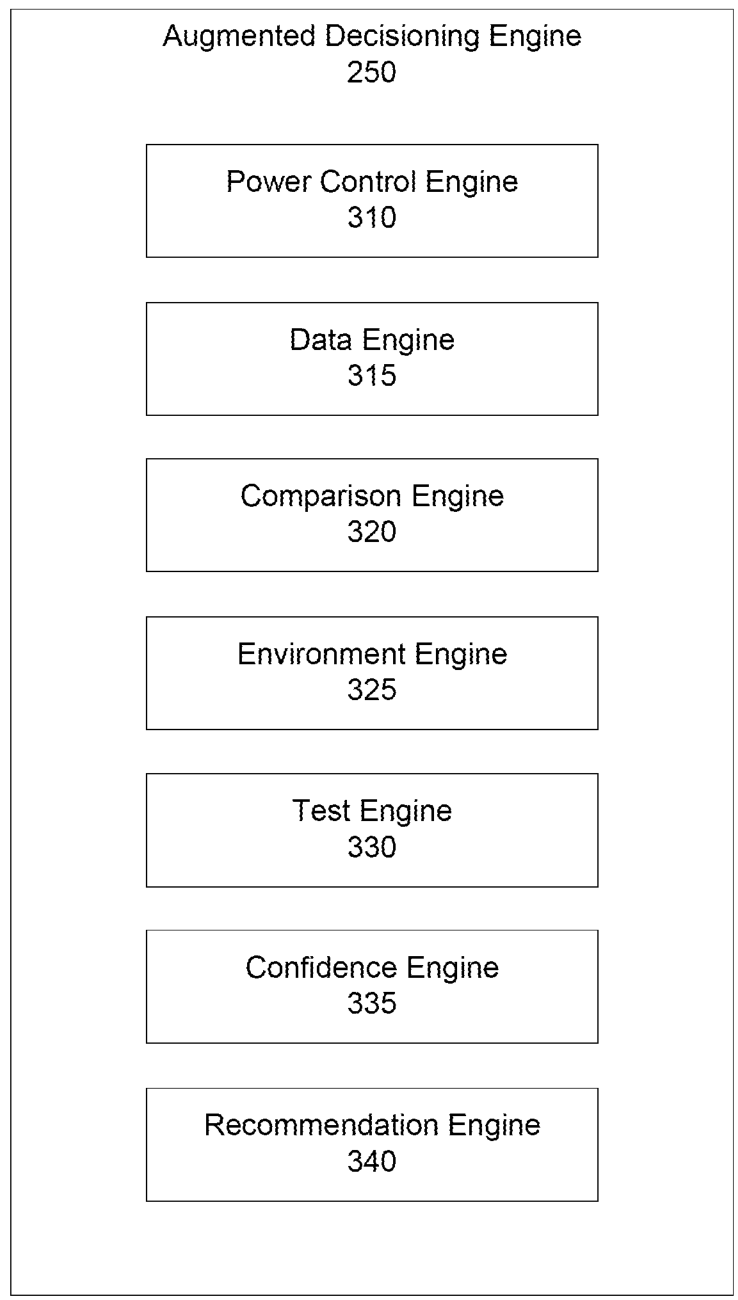
FIG. 3 is an augmented decisioning engine that may be utilized within the testing system of FIG. 2, according to an embodiment of the present disclosure.

FIG. 3 illustrates in greater detail augmented decisioning engine 250 of FIG. 2. According to the present disclosure, augmented decisioning engine 250 may be running in an environment substantially similar or identical to environment 100 or testing system 200 and may include a power control engine 310, a data engine 315, a comparison engine 320, an environment engine 325, a test engine 330, a confidence engine 335, and a recommendation engine 340. In embodiments, power control engine 310 may spin-up (e.g., power-up, launch, or otherwise instantiate) test infrastructure 130 or testing platform 260 so that augmented decisioning engine 250 may automatically generate a recommendation. Further, power control engine 310 may shut down test infrastructure 130 or testing platform 260 responsive to the recommendation being generated or implemented in a production environment.

Data engine 315 may retrieve/receive data from the various sub-components included in environment 100 or testing system 200. For instance, data engine 315 may retrieve, from production environment 140/280, metrics data indicative of performance of system 152, or any other system, operating in production environment 140/280. Moreover, data engine 315 may receive data describing a configuration of production infrastructure 150. In various embodiments, production infrastructure 150 is running system 152 operating in production environment 140. Data engine 315 may also receive expected performance values of system 152 and/or of any other computing system/infrastructure included in production environment 140.

According to the present disclosure, augmented decisioning engine 250 may compare, via comparison engine 320, metrics data with expected performance values (i.e., from infrastructure metrics 222, application and business metrics 226, or metrics stored in database 270 produced by production environment 280). The comparison of the metrics data with the expected performance values may train the augmented decisioning engine 250 to provide a recommended configuration of production infrastructure 150. The recommendation may suggest a configuration of any computing systems (e.g., system 152) and/or computing resources (e.g., computing resources 155) included in production infrastructure 150.

Responsive to comparing the metrics data and the expected performance values performed by comparison engine 320, augmented decisioning engine 250 may be further trained to improve subsequent recommendations of the configuration of the production infrastructure 150 through a feedback process adjusting augmented decisioning engine 250 based on an indication of whether the configuration of production infrastructure 150 meets a specified threshold related to metrics values. For example, augmented decisioning engine 250 may use one or more of active learning algorithms, supervised learning algorithms, backpropagation algorithms, clustering algorithms, regression algorithms, decision trees, reduction algorithms, and neural network algorithms for training.

Environment engine 325 may configure test infrastructure 130 based on the type of data retrieved/received by data engine 315. In embodiments, environment engine 325 may configure test infrastructure 130 to include a specified set of computing resources 13X. To configure test infrastructure 130, environment engine 325 may provision computing resources 13X in a cloud computing environment. The computing resources 13X provisioned may include data repositories, computing services, and/or the like. Provisioning computing resources 13X in a cloud computing environment may further include allocating or reapportioning computing resources 13X based on the metrics data, the data describing the configuration of the production infrastructure, and/or the expected performance values received by data engine 315, and/or the annotation of any generated recommendations.

In some examples, environment engine 325 may use any combination of advanced provisioning, dynamic provisioning, or user self-provisioning to provision computing resources 13X. Additionally and/or alternatively, to configure test infrastructure 130, environment engine 325 may transmit instructions to computing resources 13X over network 180. The instructions may be a script or other computer-executable file for automatically configuring test infrastructure 130 and/or for managing computing resources 13X included therein.

Responsive to environment engine 325 configuring test infrastructure 130, test engine 330 may determine a test (or series of tests) to perform on the data retrieved/received by date engine 315. The test may be performed by test engine 330 itself, or the test may be performed by test infrastructure 130. Additionally and/or alternatively, test engine 330 may coordinate with test infrastructure 130, via network 180, to perform the test(s). In accordance with the present disclosure, the tests performed or coordinated by test engine 330 may include NFR testing.

In some examples, test engine 330 may transmit data on which a test is to be performed to test infrastructure 130 over network 180. While the test is being performed by test infrastructure 130, test infrastructure 130 may communicate, via network 180, information corresponding to utilization of computing resources 13X included therein to test engine 330. The information is communicated to enable test engine 330 to manage, allocate, or otherwise reapportion computing resources 13X as the test is being performed. For example, if the test performed by test infrastructure 130 indicates that system 152 is running without memory resources capable of performing operations within an allotted timeframe, the test infrastructure may reapportion memory included amongst computing resources 13X to production infrastructure 150 and/or system 152 to support the continued operation of system 152. Once the test is complete, test infrastructure 130 communicates the outcome of the test performed to test engine 230 via network 180.

Confidence engine 335 may receive an annotation for the recommendation of configuration of production infrastructure 150 generated based on comparing the metrics data to expected performance values. Based on the annotation, confidence engine 335 generates a confidence score, the confidence score being used to generate subsequent recommendations for the configuration of production infrastructure 150.

Recommendation engine 340 may generate the recommendation based on the comparing the metrics data to the expected performance values. Further, recommendation engine 340 may also generate a subsequent recommendation based on the confidence score of previously generated recommendations.

In an example embodiment, a system for automatically generating a recommendation, such as augmented decisioning engine 250 of FIG. 2, may be running (e.g., executing operations) in environment 100 or testing environment 200. Augmented decisioning engine 250 may include a memory and a processor in communication with the memory (the memory and the processor are not shown in FIG. 1). Augmented decisioning engine 250 may be configured to retrieve from a production environment (such as production environment 140) metrics data indicative of performance of a system (such as system 152) operating in production environment 140.

Data describing a configuration of a production infrastructure (such as production infrastructure 150) may be received by augmented decisioning engine 250 via a data engine, such as data engine 315. In embodiments, production environment 150 may include any combination of computing clusters, servers, databases, applications, or other computing resources (e.g., computing resources 155). Data engine 315 may also receive expected performance values for system 152. In some examples, the data describing the configuration of the production environment and the expected values are received as one or more pieces of data supplied via a user input from a non-production environment. The user input may be supplied by user device 160.

For example, a software developer (i.e., a user) may be tasked with designing a production infrastructure included in, or hosted by, a production environment to a particular set of specifications. In embodiments, the production infrastructure can be an enterprise's website (as implemented by any combination of computing clusters, servers, databases or other computing devices configured to provide the website), while a production environment can be the same or similar to production environment 140. The specifications can include accommodating a specified number of concurrent visitors (e.g., 10,000), handling a maximum number of simultaneous user requests (e.g., up to 1,000 visitors to the website clicking on the same link at the same time), and so on. The developer may also be tasked with meeting certain overhead criteria. As an example, even when under maximum load, the infrastructure hosting the website can be configured not to exceed 75% RAM/CPU usage.

Once a desired configuration/specification for the production infrastructure is determined, the developer may design and test the production infrastructure in a non-production environment (e.g., a code-testing or quality assurance environment). The design and testing can use dedicated non-production infrastructure (e.g., test infrastructure 130 or testing platform 260). Via a user device, such as user device 160, the developer may be able to modify the number of concurrent visitors and/or the number of simultaneous requests experienced by the website along with the amount of RAM, the amount of storage space and/or the amount of available processing capacity of the CPU provided by the non-production infrastructure hosting the website.

Augmented decisioning engine 250 may be further configured to compare the metrics data to the expected performance values. A comparison engine, such as comparison engine 320, included in augmented decisioning engine 250 may perform the comparison. Based on the results of the comparison, augmented decisioning engine 250 may be trained to improve subsequent recommendations of configuration of production infrastructure 150 through a feedback process adjusting augmented decisioning engine 250 based on an indication of whether the configuration of production infrastructure 150 performs at the stated threshold level. A developer may supply, via a user device (e.g., user device 160), the indication of whether the configuration of production infrastructure 150 meets the threshold.

Augmented decisioning engine 250 may be further configured to automatically spin up an infrastructure, such as test infrastructure 130 or testing platform 260. Power control engine 310 included in augmented decisioning engine 250 may be used to spin up test infrastructure 130, and test infrastructure 130 may include any combination of computing clusters, servers, databases, applications, or other computing resources (e.g., computing resources 13X).

Environment engine 325 included in augmented decisioning engine 250 may be used to configure, automatically, test infrastructure 130 based on a type of metrics data retrieved by data engine 315 from production environment 140. The type of metrics data retrieved from production environment 140 may correspond to one or more of CPU usage, memory usage, other system overhead limitations, network downlink rate, network uplink rate, other network bandwidth limitations, application logs, overall speed, responsiveness, or stability of a system in production environment 140 or production environment 280 (e.g., production infrastructure 150 and/or any other computing system/resource that may be included therein).

Augmented decisioning engine 250 may be further configured to perform, based on the configuring, a test on the test components (i.e., software or code under development). In some examples, a test engine, such as test engine 330, may be used to perform the test. In other examples, test engine 330 may select a test, or a series of tests, to perform on the test components based on the configuring. In these other examples, test engine 330 included in augmented decisioning engine 250 may be configured to manage, allocate, or otherwise reapportion any combination of the computing clusters, servers, databases, applications, or other computing resources included in test infrastructure 130 to production infrastructure 150 based on the recommended configuration of production infrastructure 150. Network 180 enables communications between augmented decisioning engine 250 (and all sub-components thereof, such as test engine 330) to communicate with test infrastructure 130/testing platform 260 to execute, orchestrate, and/or otherwise enable the test to be performed on the test components. The outcome of the test is communicated from test infrastructure 130/testing platform 260 to test engine 330 over network 180.

Responsive to receiving the outcome of the test performed, comparison engine 320 included in augmented decisioning engine 250 may compare the outcome received to an expected outcome. In some examples, the expected outcome may be received by test engine 330 as one or more pieces of data supplied via a user input. In accordance with the present disclosure, the user input may be supplied by user device 160. In other examples, the expected outcome of various tests performed in environment 100 or testing environment 200 may be pre-loaded into test engine 330. Additionally and/or alternatively, test engine 330 may learn outcomes to expect for the tests performed throughout training augmented decisioning engine 250.

Based on the comparison, a recommendation engine 340 included in augmented decisioning engine 250 may generate a recommendation based on a comparison of the outcome of the test performed to the expected outcome. In some examples, the recommendation generated may be to configure infrastructure/systems (e.g., production infrastructure 150/system 152) implemented/hosted in production environment 140.

Next, an annotation for the recommendation based on the comparison of the outcome of the test performed to the expected outcome is received. The annotation may be received by confidence engine 335 as one or more pieces of data supplied by a user input in a non-production environment. The user input may be supplied by user device 160.

Confidence engine 335 generates a confidence score for the recommendation based on the annotation. The annotation may, in some examples, be indicative of whether the recommendation of configuration of the production infrastructure meets a threshold (e.g., is accepted/rejected by a user of the system a specified percentage of test instances). Indication of the annotation of the recommendation of the configuration of the production infrastructure may be received via a user input as one or more pieces of data supplied by user device 160.

Recommendation engine 340 may generate a subsequent recommendation based on the confidence score of previously generated recommendations. For instance, if the confidence score of recommendations previously generated when production infrastructure 150 was configured/performing in a particular way was above a certain threshold (e.g., an acceptance ratio between 0.7 and 1.0), then, when production infrastructure 150 is configured in a substantially similar/identical way in the future, recommendation engine 340 may subsequently generate the same recommendation of configuration of production environment 150. If the confidence score did not meet the threshold value (e.g., an acceptance ratio less than 0.7), the recommendation engine 340 may adjust subsequent recommendations for configuration of production environment 150. Responsive to recommendation engine 340 generating the subsequent recommendation, augmented decisioning engine 250 may be configured to automatically shut down test infrastructure 130/testing platform 260.

In various embodiments, augmented decisioning engine 250 may be configured to use one or more of active learning algorithms, supervised learning algorithms, backpropagation algorithms, clustering algorithms, regression algorithms, decision trees, reduction algorithms, and neural network algorithms. Further, augmented decisioning engine 250 may be configured to run and test infrastructure 130 may be configured to spin up in a non-production environment.

Figure 4:
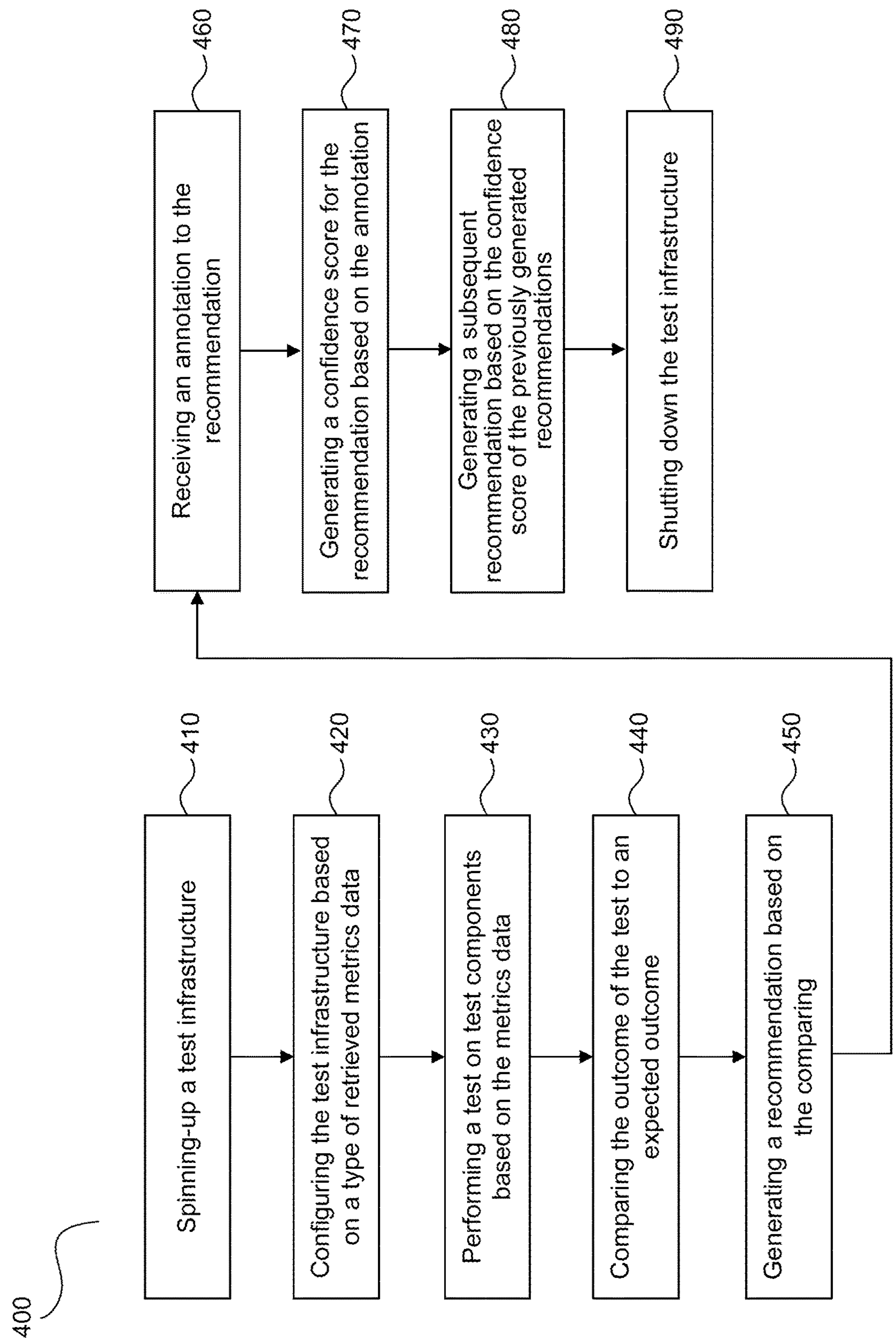
FIG. 4 is a flowchart outlining the steps of training an augmented decisioning engine, according to an embodiment of the present disclosure.

FIG. 4 is a flowchart outlining the steps of training an augmented decisioning engine (e.g., learning engine 110 or augmented decisioning engine 250) within an environment that is substantially similar/identical to environment 100 or testing environment 200.

Training augmented decisioning engine 250 may include, at step 410, automatically spinning up a test infrastructure (e.g., powering on and making available for use by a computing system, such as test infrastructure 130). In accordance with the present disclosure, the augmented decisioning engine may be running and the test infrastructure spinning up may occur in a non-production environment. Examples of a non-production environment may include, but are not limited to, a code-testing and/or a quality assurance (QA) environment. The infrastructure spun-up by the training engine may include a combination of computing clusters, servers, databases, applications, or other computing resources. The augmented decisioning engine may communicate with the infrastructure and/or other sub-components of the environment via a communications network, such as network 180.

Training the augmented decisioning engine may further include, at step 420, automatically configuring the test infrastructure based on a type of metrics data retrieved from the production environment. For example, if a particular minimum number of simultaneous executions may be specified, the test infrastructure can be configured to involve a commensurate number of servers or computing clusters to ensure the ability to deliver that minimum. As noted above, the developer can compare the results of the tests executed on the test infrastructure to the specifications and a coefficient representing a correlation between the expected values and the tested values (e.g., a confidence score) may be determined.

At step 430, training includes performing, based on the metrics-based configuring, a test on the test components (i.e., application or code under development). The test infrastructure may be configured by an environment engine that is substantially similar/identical to environment engine 325. The test may be performed, orchestrated, or otherwise enabled by a test engine that is substantially similar/identical to the test engine 330.

In some examples, the test engine may perform the test. In other examples, the test engine may orchestrate/coordinate performance of the test with the test infrastructure. In these other examples, once a test has been performed, the test infrastructure communicates the outcome to the augmented decisioning engine via the network. For example, past configurations/iterations of both production and non-production infrastructure and confidence scores may be logged and used, at least in part, to predict the success of future iterations of a web application under development. Other applications and systems with which the confidence scores may be used will be apparent to one of skill in the relevant art.

As a non-limiting example, at step 420, metrics data corresponding to memory utilization may be retrieved by the augmented decisioning engine from the production environment. Then, at step 430, the augmented decisioning engine may automatically configure the infrastructure to perform a test, or series of tests, to assess the memory utilization of the system operating in a production environment. Such a test on memory utilization may, for instance, be performed to determine if there is a memory leak within the system.

Other types of metrics data the augmented decisioning engine may retrieve from the production environment also include data corresponding to CPU utilization, memory utilization, hard disk utilization, other overhead limitations, network downlink rate, network uplink rate, port configuration, event routing, other network bandwidth limitations, applications logs, overall speed, responsiveness, or stability of the system executing operations in the production environment. The application logs may include time stamps corresponding to the application launching/shutting down, an indication of whether a task (e.g., data transfers) executed by the application was successful, and other information corresponding to how a user of the application interacts with the application. Further, based on the type of metrics retrieved, the infrastructure may be automatically configured to perform load testing, stress testing, soak testing, spike testing, breakpoint testing, configuration testing, isolation testing, internet testing, and/or the like, or a combination thereof.

Training the augmented decisioning engine further includes, at step 440, comparing the outcome of the test (or series of tests) performed to an expected outcome. The comparison may be performed by a comparison engine substantially similar/identical to comparison engine 320. A user device substantially similar/identical to user device 160 may be used to supply the user input. The outcome of the test will result in one or more metrics data values which can be compared to corresponding expected metrics data values for a given configuration.

At step 450, the training further includes generating a recommendation for configuring the production infrastructure based on the comparison. A recommendation engine substantially similar/identical to recommendation engine 340 may be used to generate the recommendation based on the comparison. Next, at step 460, training the augmented decisioning engine includes receiving, during the feedback process, an annotation for the recommendation.

The annotation may be received as one or more pieces of data supplied by a user input in the non-production environment. The annotation may be received by a confidence engine substantially similar/identical to the confidence engine 335, and the user input may be supplied by a user device substantially similar/identical to user device 160.

The training further includes, at step 470, generating a confidence score for the recommendation based on the annotation. In some embodiments, the confidence score is the indication of whether the configuration of the production infrastructure is above a certain threshold value. For example, the confidence score may be a ratio indicating whether the recommendation generated based on comparing the metrics data with the expected values was accepted or rejected by a user/developer in the non-production environment. For example, if ten total recommendations were generated, based on the comparison, and seven were accepted, the confidence score generated would be 0.7.

At step 480, training the augmented decisioning engine further includes generating a subsequent generation based on the confidence score of previously generated recommendations. For instance, previously generated recommendations receiving a high confidence score (e.g., 0.8-1.0) may be generated subsequently, provided the metrics data retrieved and expected performance values received while generating the present recommendation are substantially similar to those compared when generating previous recommendations.

Responsive to generating the subsequent recommendation, the training concludes, at step 490, by shutting down the infrastructure. This includes shutting down the combination of computing clusters, servers, databases, applications, or other computing resources included in the test infrastructure.

In various embodiments, training the augmented decisioning engine may use one or more of active learning algorithms, supervised learning algorithms, backpropagation algorithms, clustering algorithms, regression algorithms, decision trees, reduction algorithms, and/or neural network algorithms. The augmented decisioning engine may be configurable to reapportion any combination of the computing clusters, servers, databases, applications, or other computing resources included in the test infrastructure to the production infrastructure based on the recommended configuration of the production infrastructure. Computing resources 13X and 155 are examples of computing resources which the augmented decisioning engine may be configured to reapportion.

In other exemplary embodiments of the present disclosure, an environment substantially similar/identical to environment 100 or testing environment 200, including subsystems substantially similar/identical to those included in environment 100/testing environment 200, further include a non-transitory computer-readable medium storing instructions that when executed by one or more processors of a device operating in the environment cause the one or more processors to perform a method of automatically generating a recommendation. The method executed by the non-transitory computer-readable medium may be substantially similar/identical to method 300.

For instance, the method executed by the non-transitory computer-readable storage medium may include the steps of retrieving, from a production environment, metrics data indicative of performance of a system operating in the production environment, receiving data describing a configuration of a production infrastructure, the production infrastructure running the system operating in the production environment, and receiving expected performance values of the system. The method executed by the non-transitory computer-readable medium may further include comparing, by a augmented decisioning engine, the metrics data to expected performance values; and training, based on the comparing, the augmented decisioning engine to improve subsequent recommendations through a feedback process adjusting the augmented decisioning engine based on an indication of whether the configuration of the production infrastructure meets a threshold related to one or more metrics values.

Training the non-transitory computer-readable medium may include spinning up, automatically, a test infrastructure and configuring, automatically, the infrastructure based on a type of metrics data retrieved from the production environment. The training may further include performing, based on the configuring, a test on the test components, comparing the outcome of the test performed to an expected outcome, and generating a recommendation for configuring the production infrastructure based on the comparing. The training further includes receiving, during the feedback process, an annotation for the recommendation—the annotation being the indication of whether the configuration of the production infrastructure performed above a certain threshold value. The training further includes generating, based on the annotation, a confidence score for the recommendation. According to the present disclosure, the training process executed by the non-transitory computer-readable medium concludes by generating a subsequent recommendation based on the confidence score of previously generated recommendations and shutting down, automatically, the infrastructure responsive to generating the subsequent recommendation.

The non-transitory computer-readable medium may configure the augmented decisioning engine, via training, to reapportion any combination of the computing clusters, servers, databases, applications, or other computing resources included in the test infrastructure to the production infrastructure based on the recommended configuration of the production infrastructure.

In some examples, the data describing the configuration of the production infrastructure, the expected performance values, and the annotation may be received as one or more pieces of data supplied via a user input in the non-production environment.

Figure 5:
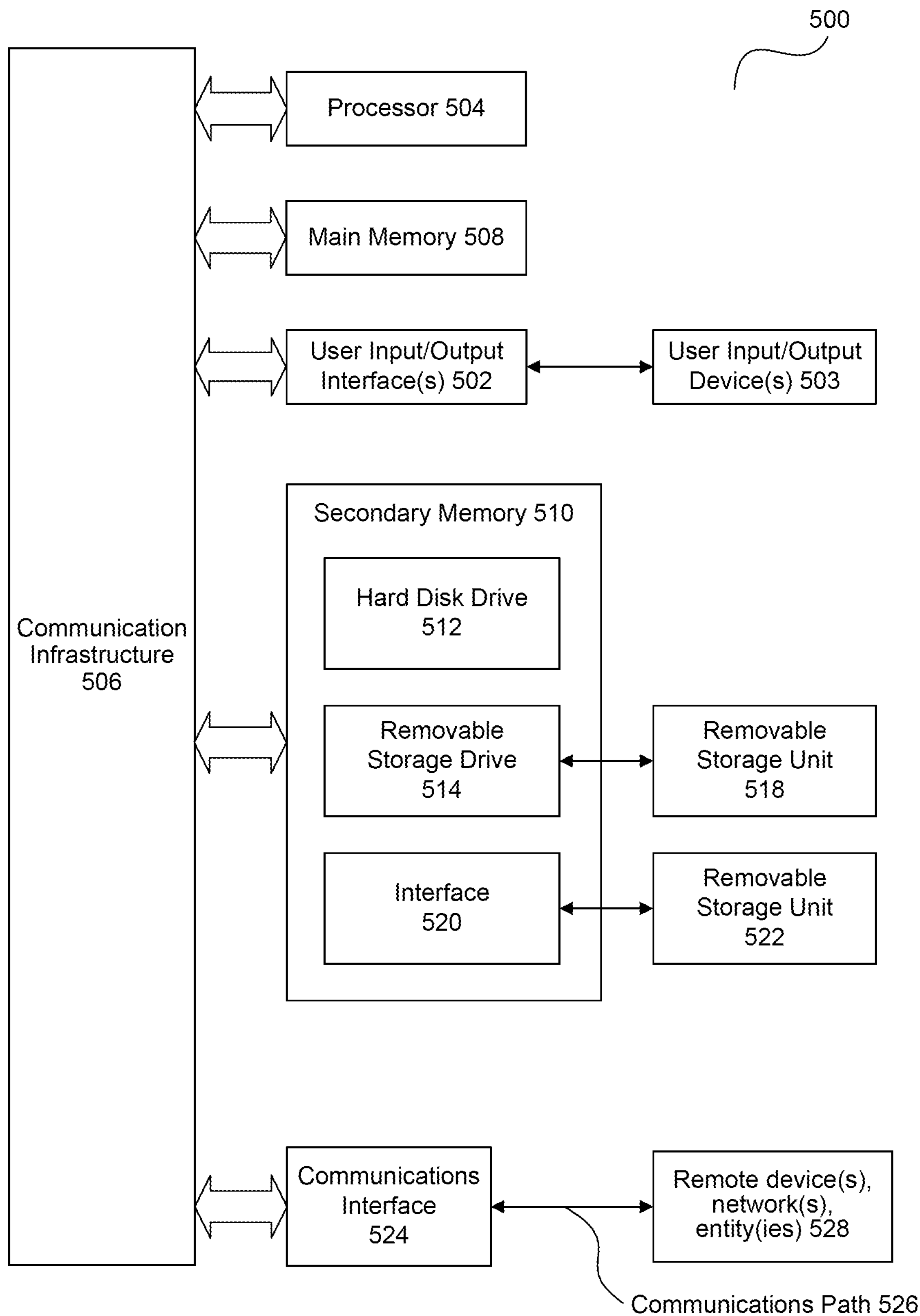
FIG. 5 is a computer system, according to an embodiment of the present disclosure.

FIG. 5 depicts an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data. Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A computer-implemented method comprising:

receiving data describing a configuration of a production infrastructure, the production infrastructure running a system operating in a production environment;

retrieving, from the production environment, one or more metrics data values indicative a performance of the system operating in the production environment;

receiving expected performance values of the system corresponding to the one or more metrics data values;

comparing, by an augmented decisioning engine, the one or more metrics data values with the expected performance values, the augmented decisioning engine being trained to provide a recommended configuration of the production infrastructure; and training, based on the comparing, the augmented decisioning engine to improve subsequent recommendations of the configuration of the production infrastructure, wherein the training comprises a feedback process that adjusts the augmented decisioning engine based on an indication of whether the recommended configuration of the production infrastructure satisfies a threshold metric data value in response to the production infrastructure running the system operating in the production environment.

2. The computer-implemented method of claim 1, wherein training the augmented decisioning engine further comprises:

spinning up, automatically, a test infrastructure;

configuring, automatically, the test infrastructure based on a type of metric data value retrieved from the production environment;

performing, based on the configuring, a test on test components based on the one or more metrics data values;

receiving, during the feedback process, an annotation for a recommendation, the annotation being the indication of whether the recommended configuration of the production infrastructure meets the threshold metric data value;

generating, based on the annotation, a confidence score for the recommendation;

generating a subsequent recommendation for configuring the production infrastructure based on the confidence score of previously generated recommendations; and shutting down, automatically, the test infrastructure responsive to generating the subsequent recommendation.

3. The computer-implemented method of claim 2, wherein the production infrastructure and the test infrastructure include any combination of computing clusters, servers, databases, applications, or other computing resources.

4. The computer-implemented method of claim 3 further comprising reapportioning, via the augmented decisioning engine, any combination of the computing clusters, servers, databases, applications, or other computing resources included in the test infrastructure to the production infrastructure based on the recommended configuration of the production infrastructure.

5. The computer-implemented method of claim 2 further comprising running the augmented decisioning engine and spinning up the test infrastructure in a non-production environment.

6. The computer-implemented method of claim 5 further comprising receiving the data describing the configuration of the production infrastructure, the expected performance values, and the annotation as one or more pieces of data supplied via a user input from the non-production environment.

7. The computer-implemented method of claim 1, wherein training the augmented decisioning engine uses one or more of: active learning algorithms, supervised learning algorithms, backpropagation algorithms, clustering algorithms, regression algorithms, decision trees, reduction algorithms, and neural network algorithms.

8. The computer-implemented method of claim 1, wherein the one or more metrics data values retrieved from the production environment correspond to one or more of CPU usage, memory usage, other system overhead limitations, network downlink rate, network uplink rate, other network bandwidth limitations, application logs, overall speed, responsiveness, or stability of the system operating in the production environment.

9. A system comprising:

a memory; and a processor in communication with the memory, configured to:

receive data describing a configuration of a production infrastructure, the production infrastructure running a system operating in a production environment;

retrieve, from the production environment, one or more metrics data values indicative of a performance of the system operating in the production environment;

receive expected performance values of the system corresponding to the one or more metrics data values;

compare, by an augmented decisioning engine, the one or more metrics data values with the expected performance values, the augmented decisioning engine being trained to provide a recommended configuration of the production infrastructure; and train, based on the comparing, the augmented decisioning engine to improve subsequent recommendations of the configuration of the production infrastructure, wherein the training comprises a feedback process that adjusts the augmented decisioning engine based on an indication of whether the recommended configuration of production infrastructure satisfies a threshold metric data value in response to the production infrastructure running the system operating in the production environment.

10. The system of claim 9, wherein the augmented decisioning engine is further configured to:

spin up, automatically, a test infrastructure;

configure, automatically, the test infrastructure based on a type of metrics data value retrieved from the production environment;

perform, based on the configuring, a test on test components based on the one or more metrics data values;

receive, during the feedback process, an annotation for a recommendation, the annotation being the indication of whether the configuration of the production infrastructure meets the threshold metric data value;

generate, based on the annotation, a confidence score for the recommendation;

generate a subsequent recommendation for configuring the production infrastructure based on the confidence score of previously generated recommendations; and shut down, automatically, the test infrastructure responsive to generating the subsequent recommendation.

11. The system of claim 10, wherein the production infrastructure and the test infrastructure include any combination of computing clusters, servers, databases, applications, or other computing resources.

12. The system of claim 11, wherein the augmented decisioning engine is configured to reapportion any combination of the computing clusters, servers, databases, applications, or other computing resources included in the test infrastructure to the production infrastructure based on the recommended configuration of the production infrastructure.

13. The system of claim 10, wherein the augmented decisioning engine and the test infrastructure are configured to operate in a non-production environment.

14. The system of claim 13, wherein data describing the configuration of the production infrastructure, the expected performance values, and the annotation are received as one or more pieces of data supplied via a user input from the non-production environment.

15. The system of claim 9, wherein the augmented decisioning engine is configured to use one or more of: active learning algorithms, supervised learning algorithms, backpropagation algorithms, clustering algorithms, regression algorithms, decision trees, reduction algorithms, and neural network algorithms.

16. The system of claim 9, wherein the one or more metrics data values retrieved from the production environment corresponds to one or more of CPU usage, memory usage, other system overhead limitations, network downlink rate, network uplink rate, other network bandwidth limitations, application logs, overall speed, responsiveness, or stability of the system operating in the production environment.

17. A non-transitory computer-readable medium storing instructions that when executed by one or more processors of a device cause the one or more processors to perform a method of:

receiving data describing a configuration of a production infrastructure, the production infrastructure running a system operating in a production environment;

retrieving, from the production environment, one or more metrics data values indicative of a performance of a system operating in the production environment;

receiving expected performance values of the system corresponding to the one or more metrics data values;

comparing, by an augmented decisioning engine, the one or more metrics data values with the expected performance values, the augmented decisioning engine being trained to provide a recommended configuration of the production infrastructure; and training, based on the comparing, the augmented decisioning engine to improve subsequent recommendations of the configuration of the production infrastructure, the training comprising a feedback process that adjusts the augmented decisioning engine based on an indication of whether the recommended configuration of the production infrastructure satisfies a threshold metric data value in response to the production infrastructure running the system operating in the production environment.

18. The non-transitory computer-readable medium of claim 17, wherein training the augmented decisioning engine further comprises:

spinning up, automatically, a test infrastructure;

configuring, automatically, the test infrastructure based on a type of metrics data value retrieved from the production environment;

performing, based on the configuring, a test on test components based on the one or more metrics data values;

generating a recommendation for configuring the production infrastructure based on the comparing;

receiving, during the feedback process, an annotation for the recommendation, the annotation being the indication of whether the recommended configuration of the production infrastructure meets the threshold metric data value;

generating, based on the annotation, a confidence score for the recommendation;

generating a subsequent recommendation for configuring the production infrastructure based on the confidence score of previously generated recommendations; and shutting down, automatically, the test infrastructure responsive to generating the subsequent recommendation.

19. The non-transitory computer-readable medium of claim 18, wherein the augmented decisioning engine is configurable, via training, to reapportion any combination of computing clusters, servers, databases, applications, or other computing resources included in the test infrastructure to the production infrastructure based on the recommended configuration of the production infrastructure.

20. The non-transitory computer-readable medium of claim 18, wherein the data describing the configuration of the production infrastructure, the expected performance values, and the annotation are received as one or more pieces of data supplied via a user input from a non-production environment.

* * * * *